(12) United States Patent
Novoselsky et al.

(10) Patent No.: US 10,983,208 B2
(45) Date of Patent: Apr. 20, 2021

(54) SYSTEM AND METHOD FOR INTEGRATION OF DATA RECEIVED FROM GMTI RADARS AND ELECTRO OPTICAL SENSORS

(71) Applicant: Elta Systems Ltd., Ashdod (IL)

(72) Inventors: Akiva Novoselsky, Modi'in (IL); Benjamin Kupfer, Ramat Gan (IL); Merav Shomrony Danieli, Herzliya (IL)

(73) Assignee: ELTA SYSTEMS LTD., Ashdod (IL)

( * ) Notice: Subject to any disclaimer, the term of this patent is extended or adjusted under 35 U.S.C. 154(b) by 201 days.

(21) Appl. No.: 16/205,548

(22) Filed: Nov. 30, 2018

(65) Prior Publication Data
US 2019/0204434 A1   Jul. 4, 2019

(30) Foreign Application Priority Data

Dec. 31, 2017 (IL) .......................................... 256680
Mar. 25, 2018 (IL) .......................................... 258347

(51) Int. Cl.
*G01S 13/86* (2006.01)
*G01S 13/52* (2006.01)
(Continued)

(52) U.S. Cl.
CPC ............ *G01S 13/867* (2013.01); *G01S 13/52* (2013.01); *G01S 13/72* (2013.01); *G01S 13/723* (2013.01);
(Continued)

(58) Field of Classification Search
CPC combination set(s) only.
See application file for complete search history.

(56) References Cited

U.S. PATENT DOCUMENTS 7,081,849 B2 *  7/2006  Collins ................. G01S 13/726
                                                    342/160
8,314,732 B2 * 11/2012  Oswald .................. G01S 7/415
                                                    342/90
(Continued)

OTHER PUBLICATIONS

Bar-Shalom, Yaakov et al., "Estimation with Applications to Tracking and Navigation", 2001, pp. 321-338.
(Continued)

*Primary Examiner* — Mamadou L Diallo
(74) *Attorney, Agent, or Firm* — Dorsey & Whitney LLP

(57) ABSTRACT

A fusion system and method for constructing tracks of a ground target from radar and optical detections are described. The system includes a radar channel and an optical channel. The radar channel includes a Ground Moving Target Indicator (GMTI) radars providing GMTI detections in the form of GMTI plots, a GMTI tracker configured for constructing GMTI tracks of the ground target from the GMTI plots, and a Smooth Radar Plots generator configured for sequentially in time producing smooth radar plots in the form of locations of ground target on the GMTI tracks and corresponding location errors. The optical channel includes electro optical (EO) sensors sequentially in time providing EO detections in the form of coordinates of the ground target, and a combiner tracker configured for combining data streams of the radar channel with data streams of the optical channel, and producing fused tracks of the ground target.

16 Claims, 5 Drawing Sheets

(51) Int. Cl.
    *G01S 13/72*    (2006.01)
    *G01S 13/931*   (2020.01)
(52) U.S. Cl.
    CPC ..... *G01S 13/931* (2013.01); *G01S 2013/9322* (2020.01)

(56) References Cited

U.S. PATENT DOCUMENTS

| | | | |
|---|---|---|---|
| 9,390,624 B2 | 7/2016 | Minemura et al. | |
| 2008/0255911 A1* | 10/2008 | Khosla | G01S 5/0294 705/7.38 |
| 2009/0292468 A1 | 11/2009 | Wu et al. | |
| 2010/0157056 A1 | 6/2010 | Zohar et al. | |
| 2011/0298654 A1* | 12/2011 | Hellsten | G01S 13/9017 342/25 A |
| 2014/0035775 A1* | 2/2014 | Zeng | G01S 13/931 342/52 |
| 2014/0279820 A1* | 9/2014 | MacPherson | G01S 13/723 706/55 |
| 2016/0170019 A1* | 6/2016 | Owirka | G01S 13/5242 342/25 B |
| 2016/0231423 A1* | 8/2016 | Enderli | G01S 13/87 |
| 2017/0102458 A1* | 4/2017 | Schuman | G01S 7/288 |
| 2017/0206436 A1 | 7/2017 | Schiffmann | |
| 2017/0363733 A1 | 12/2017 | Guerrini et al. | |

OTHER PUBLICATIONS

Blackman, Samuel et al., "Design and Analysis of Modern Tracking Systems", Artech House, 1999, pp. 678-699.

Maggio, Emilio et al., "Video Tracking: Theory and Practice", Chapter 7: Multi-Target Management, 2011, pp. 131-159.

Mallick, Mahendra et al., "Integrated Tracking, Classification and Sensor Management: Theory and Application", Chapter 6: Tracking and Data Fusion for Ground Surveillance; Chapter 9: Advances in Data Fusion Architectures, 2012, pp. 203-217, 363-373.

* cited by examiner

SYSTEM AND METHOD FOR INTEGRATION OF DATA RECEIVED FROM GMTI RADARS AND ELECTRO OPTICAL SENSORS

TECHNOLOGICAL FIELD

This invention relates generally to fusing and tracking of ground targets from multiple sources, and more particularly to fusing and tracking of data received from Ground Moving Target Indicator (GMTI) radars and electro optical sensors.

BACKGROUND ART

References considered to be relevant as background to the presently disclosed subject matter are listed below:

1. "Design and Analysis of Modern Tracking Systems" by Samuel Blackman and Robert Popoli, Artech House, 1999.
2. "Estimation with Applications to Tracking and Navigation", by Yaakov Bar-Shalom, X.-Rong Li, Thiagalingam Kirubarajan, John Wiley & Sons, 2001.
3. "Video Tracking: Theory and Practice", by Emilio Maggio and Andrea Cavallaro, John Wiley & Sons, 2011.
4. "Integrated Tracking, Classification and Sensor Management: Theory and Application", by Mahendra Mallick, Vikram Krishnamurthy, and Ba-Ngu Vo., John Wiley & Sons, 2012.

Acknowledgement of the above references herein is not to be inferred as meaning that these are in any way relevant to the patentability of the presently disclosed subject matter.

BACKGROUND

The use of combination of radar and image information from radar and electro optical (EO) sensors for target tracking, can potentially provide better performance than a single type detection system. Ground Moving Target Indicator (GMTI) radars detect ground moving targets. The detections of a GMTI radar are usually called plots, since, in the past, primarily each detection was identified by a plot on the screen. Each plot provided from a GMTI radar includes more accurate, as well as less accurate, data. The accurate data include the radial distance between the radar and the target and the radial velocity of the target, while the non-accurate data include the azimuth angle of the target. In addition, the data from a GMTI radar include the estimation of appropriate errors for the values of target parameters associated with the noise, and other inaccuracies of the measurements.

One of the drawbacks of the data provided by GMTI radars is that there is no indication on the type of ground moving target that is detected. Consequently, the target may be, for instance, either a small motorcycle or a huge van.

EO-sensors, however are able to provide additional information on the target that is not provided by GMTI radars, such as target identification, its accurate location, and target azimuth angle. EO detections, however, do not provide information on the velocity of the target.

Sensor fusion can reduce uncertainty, such that the resulting information from sensor fusion can have less uncertainty than the individual sources. Therefore, it is advantageous to have the ability to detect ground targets, both by a GMTI radar and an optical sensor, simultaneously. Thus, the main reason for fusion of data provided by radar and EO-sensors is to exploit the complementary data of both types of detecting systems and construct combined tracks of ground targets based on data from both the radar and the EO-sensors.

Theoretically, the best tracking performance can be achieved by using measurements from the radar and the EO-sensor directly. However, due to communication or organization constraints, known systems have a hierarchical structure where the fusion system has no direct access to the radar and EO-sensor data. Instead, the radar and EO-sensor data are processed locally to form radar and EO-sensor tracks, which are then fused to form common system tracks.

Various different tracker algorithms are known in the art [1-4] for constructing ground tracks of ground targets from GMTI plots. These algorithms include assignment algorithms between new plots and already calculated tracks, a filter (e.g., a Kalman filter) that reduces the noise of the plots, an algorithm for smoothing, more special algorithms for each tracker, etc. As a result of using these algorithms, one can practically obtain tracks that are relatively close to the real tracks of the various targets. However, because of radar measurement errors and inaccurate data of the plots, the calculated tracks never overlap with the real tracks, even with a perfect tracker.

Although some of the prior art algorithms are rather sophisticated, they are not able to overcome the inaccuracy of azimuthal parameters of the plots. They also have the usual tracking problems, such as missing of assignments and/or wrong assignments between the plots and tracks.

Likewise, various tracker algorithms are known in the art [3] for constructing pictures including ground tracks of ground targets from detections provided by EO-sensors. These tracks are usually restricted to small areas on the ground, because of optical sensor restrictions. Moreover, location of targets on the map is not precise, since location of the scene, where the targets are located on the map, is not known accurately.

In order to overcome the limitations of the tracks obtained from radar plots and of the tracks obtained from optical detections, various algorithms for constructing fusion tracks, i.e., the combined tracks that are constructed from radar tracks and optical tracks, are known in the art [4].

A general block diagram of a prior art fusion system 10 for constructing fusion tracks of ground targets from detections obtained from GMTI radars simultaneously with EO-sensors, is shown in FIG. 1. The system 10 has a radar channel 101 and an optical channel 102.

The radar channel 101 includes one or more GMTI radars 11 providing GMTI detections, and a GMTI tracker 110 arranged downstream of the GMTI radars 11. The GMTI tracker 110 is configured for constructing GMTI ground tracks of ground targets from the GMTI plots provided by the GMTI radars 11.

The optical channel 102 includes one or more EO-sensors 12 providing EO detections, and an EO-tracker 120 arranged downstream of the EO-sensors 12. The EO-tracker 120 is configured for constructing optical tracks from optical detections that are extracted from video pictures provided by the EO-sensors 12.

The radar channel 101 and the optical channel 102 are combined by a combiner tracker 13 arranged downstream of the GMTI radars 11 and the EO-tracker 120.

The system 10 can, for example, employ a method that is referred to as track-to-track fusion [2]. This method includes application of an assignment algorithm between radar tracks and optical tracks. It should be noted that track-to-track fusion is rather a complicated method, especially in an area which may have several targets. In particular, it is known that even if the assignment between two given tracks is correct, it is not straightforward to estimate the correct fused location and velocity [2]. Moreover, even for the simplest case, where the target is moving in a straight line, the estimation of fused tracks is not precise, since the noise and uncertainties of the locations and velocities of the target in a GMTI track and in an optical track are not known accurately. Accordingly, in more complicated situations, for example, in the case of different types of maneuvers, the results are even less accurate.

GENERAL DESCRIPTION

Despite prior art in the area of constructing ground tracks of ground targets from detections obtained from Ground Moving Target Indicator (GMTI) radars and electro optical (EO) sensors, there is still a need to provide the ability to construct fused tracks of high quality for ground moving targets.

It would be advantageous to use the benefits of radar technology to provide the ability to track vehicles for relatively long ranges, as well as the advantages of optical sensors, to identify the target.

It would also be beneficial to utilize the fact that optical detections are more accurate for calculation of the azimuth angle when compared with GMTI SRPs, since optical detections are obtained, approximately, 2-4 times per second, whereas radar detections are obtained approximately 4-20 times per minute.

Thus, according to a general aspect of the present invention, a novel fusion system for constructing ground tracks of ground targets from radar and optical detections is provided.

The fusion system includes a radar channel, an optical channel and a combined tracker configured to combine data streams of radar and optical channels. According to an embodiment of the present invention, the radar channel includes one or more GMTI radars providing GMTI detections in the form of GMTI plots. The radar channel also includes a GMTI tracker arranged downstream of the GMTI radars, and is configured for constructing GMTI tracks of the ground target from the GMTI plots provided by the GMTI radars. The radar channel also includes a Smooth Radar Plots (SRPs) generator arranged downstream of the GMTI tracker. The SRPs generator is configured for sequentially producing last locations of ground targets in the GMTI tracks.

According to an embodiment of the present invention, the optical channel includes one or more electro optical (EO) sensors providing EO detections in the form of coordinates of the ground target. When the number of EO sensors is more than one, the optical channel also includes an EO detections buffer arranged downstream of the EO-sensors, which is configured for providing sorted in time EO detections.

A SRP of a given track at a certain time corresponds to a location of the target on the GMTI track at this time. Such SRPs for a given track are obtained by sequentially in time assigning a corresponding GMTI plot to the given track, applying an appropriate filter to the GMTI plot to obtain an updated track each time, and then by calculating the location of the target on the updated track at the corresponding times.

According to an embodiment of the present invention, the SRPs generator includes an assigning system configured for sequentially assigning the GMTI plots to corresponding GMTI tracks, a filter configured for applying to the GMTI plots, and an SRP calculator configured for sequentially calculating location of the ground target on the GMTI tracks.

The filter can be a suitable filter selected from Covariance Intersection filters, Maximum Likelihood filters, and/or Kalman filters, etc.

According to the present invention, fused tracks are based on Smooth Radar Plots (SRPs) obtained from detections from GMTI radar tracks and simultaneously detections of optical sensors. For this purpose, the combiner tracker of the present invention is configured to combine data streams of the radar channel generated by the SRPs generator with data streams of the optical channel provided by the EO detection buffer, and to produce fused tracks of the ground target.

According to an embodiment of the present invention, the combiner tracker includes: a combiner tracker plot generator, a candidate track selection system coupled to the combiner tracker plot generator, an associations system coupled to the combiner tracker plot generator, a geographical updates system coupled to the associations system, a track update and exclusion ambiguities system coupled to the geographical updates system, a track situation picture generator coupled to said track update and exclusion ambiguities system, and a combiner tracker database coupled to said combiner tracker plot generator, the candidate track selection system, the associations system, the geographical updates system, and to the track update and exclusion ambiguities system.

According to an embodiment of the present invention, the combiner tracker plot generator is configured for sequentially receiving SRPs and EO detections, and combining them into one-state vectors, thereby generating ground target plots (GTPs). The candidate track selection system is configured for sequentially finding a plurality of candidate fused tracks that can be associated with a corresponding GTP obtained from said combiner tracker plot generator. The associations system is configured for sequentially computing a value of likelihood functions for association of the corresponding GTP with said plurality of candidate fused tracks to provide a score and update each fused track. The geographical updates system is configured for sequentially receiving updated fused tracks calculated by the associations system and calculating geo-updates. The track update and exclusion ambiguities system is configured for receiving the associations of the GTPs with the corresponding fused tracks generated by the associations system, and calculating ambiguities of such associations and exclusions of certain tracks. The track situation picture generator is configured for periodically selecting best fusion tracks generated by said track update and exclusion ambiguities system, and generating ground fusion track pictures including best fused tracks which have the highest score.

According to an embodiment of the present invention, the associations system includes a prediction target state system and an optimized state and likelihood system. The prediction target state system is configured for sequentially in time predicting the target coordinates and velocity for each candidate track from the plurality of the candidate tracks associated with the new GTP at the corresponding times. The optimized state and likelihood system is configured for applying an assignment procedure for predicted fused tracks and the corresponding GTP for computing optimized target coordinates and velocity, and a likelihood of the association of the GTP with the predicted tracks. The optimized state and likelihood system includes a filter selected from Kalman filters, Covariance Intersection filters and/or Maximum Likelihood filters, etc.

According to an embodiment of the present invention, the combiner tracker database includes the following database pools: a GTPs pool, a fused tracks pool, a geographical updates pool, an association pool, an ambiguities pool, an exclusion pool, a picture pool, and a history pool. The GTPs pool is configured to store the GTPs generated by the combiner tracker plot generator. An input of the GTPs pool is coupled to the combiner tracker plot generator, while an output of the output of the GTPs pool is coupled to the candidate track selection system. The fused tracks pool is configured to store the updated fused tracks that were calculated. An input of the fused tracks pool is coupled to the track update and exclusion ambiguities system, while an output of the fused tracks pool is coupled to the candidate track selection system. The geographical updates pool is configured to store data related to location of the updated tracks on a real world map. An input of the geographical updates pool is coupled to the geographical updates system, while an output of the geographical updates pool is coupled to the candidate track selection system. The association pool is configured to store associations between the fused tracks and the GTPs. An input of the association pool is coupled to the track update and exclusion ambiguities system, while an output of the association pool is coupled to the candidate track selection system. The ambiguities pool is configured to store information on ambiguities along with a list of the corresponding tracks in which the ambiguities appear. An input of the ambiguities pool is coupled to the track update and exclusion ambiguities system, while an output of the ambiguities pool is coupled to the candidate track selection system. The exclusion pool is configured for storing a list of excluded tracks. An input of the exclusion pool is coupled to the track update and exclusion ambiguities system, while the output of the exclusion pool is coupled to the candidate track selection system. The picture pool is configured for storing pictures including fused tracks having the greatest score, where an input of the picture pool is coupled to the track update and exclusion ambiguities system, while an output of the picture pool is coupled to the candidate track selection system. The history pool is configured to store history information on previous pictures. An input of the history pool is coupled to the track update and exclusion ambiguities system, while the output is coupled to the maintenance system.

According to an embodiment of the present invention, the combiner tracker includes a maintenance system coupled to the history pool of the combiner tracker database. The maintenance system is configured for deleting obsolete tracks in the history pool.

According to another general aspect of the present invention, a method for constructing tracks of a ground target from radar and optical detections is provided. The method includes sequentially in time providing Ground Moving Target Indicator (GMTI) detections from one or more GMTI radars in the form of GMTI plots, and electro optical (EO) detections in the form of coordinates of the ground target by at least one electro EO sensor. The method also includes sequentially in time constructing GMTI tracks of the ground target from the GMTI plots by the GMTI tracker arranged downstream of the GMTI radars, and sequentially in time producing SRPs in the form of locations of ground target on the GMTI tracks and corresponding location errors by a Smooth Radar Plots (SRPs) generator arranged downstream of the GMTI tracker. The data streams generated by the SRPs generator are combined with the data streams provided by the EO sensor for producing fused tracks of the ground target.

When the system includes a plurality of EO sensors, the method also includes sequentially in time providing EO detections in the form of coordinates of the ground target by the plurality of electro EO sensors, and sorting the EO detections in time. Thus, according to this embodiment, sorted in time EO detections are relayed to the combiner tracker.

According to an embodiment of the present invention, the producing of the SRPs includes sequentially assigning the GMTI plots to corresponding GMTI tracks, applying a filter to the GMTI plots, and sequentially calculating location of the ground target on the GMTI tracks.

According to an embodiment of the present invention, producing of the fused tracks of the ground target includes: sequentially receiving SRPs and EO detections and combining them in one-state vectors, thereby generating ground target plots (GTPs); sequentially finding a plurality of candidate fused tracks that can be associated with a corresponding GTP; sequentially computing a value of likelihood functions for association of the corresponding GTP with said plurality of candidate fused tracks, providing a corresponding score to each fused track, and generating updated fused tracks; sequentially calculating geo-updates including data related to location of the updated fused tracks on a real world map; sequentially receiving the associations of the GTPs with the corresponding updated fused tracks, and calculating ambiguities of such associations and exclusions of certain tracks; and periodically selecting updated fusion tracks having the greatest score, and generating ground fusion track pictures including best fused tracks which have the highest score.

According to an embodiment of the present invention, a period for generating each new ground fusion track picture can be in the range of 5 seconds to 10 seconds.

According to an embodiment of the present invention, the producing of the fused tracks of the ground target includes sequentially storing the GTPs; the updated fused track; data related to location of the updated fused tracks on a real world map; associations between the fused tracks and the GTPs; information on ambiguities along with a list of the corresponding tracks in which the ambiguities appear; information on exclusions including a list of excluded tracks; the ground fusion track pictures; and information history on previous pictures.

According to an embodiment of the present invention, the method for constructing tracks of a ground target of the present invention also provides maintenance by deleting obsolete tracks in the information history.

As described above, the GMTI radars provide radar plots. Each radar plot includes more accurate as well as less accurate data. In particular, each radar plot includes, inter alia, such accurate data as a radial distance between the target and the radar and a radial component of the total velocity of the target relative to the radar. Likewise, each plot includes less accurate data, such as an azimuth angle of the target relative to the radar location. This means that the location of the target is not known accurately, while the total velocity of the target (that includes also an angular component in addition to the known radial component) is completely unknown. In addition to this information, noise and other uncertainties of the useful data can also be ascertained from the radar detections after applying suitable signal processing. On the other hand, EO sensors provide accurate information on target location, if the picture can be located on the world map by geo-referencing, while no direct information on the target velocity is known from EO detections.

Since the data from EO sensors and GMTI tracker are different, it is rather complicated to treat them in a similar way in a combiner tracker. Therefore, according to the present invention, the radar plots are inserted first into a GMTI tracker, and then relayed to a SRP generator to generate smooth radar plots (SRPs), which are only then relayed to the combiner tracker, along with EO detections.

According to an embodiment of the present invention, the processing of the GMTI tracks includes extraction of these SRPs from the GMTI radar tracks and assigning them to the fused tracks. Accordingly, the tracks obtained from SRPs are more accurate than regular GMTI tracks.

The system for constructing ground tracks of ground targets from the detections obtained from GMTI radars and EO-sensors of the present invention has many of the advantages of prior art techniques, while simultaneously overcoming some of the disadvantages normally associated therewith.

According to the invention, due to the presence of EO detections in addition to radar detections, the technique of the present invention enables tracking ground moving targets, after classification of the targets, even in bad weather or poor vision conditions.

Also, according to the invention, GMTI radar can continue to detect the target for a longer range after the vehicle passes the scanning area of the optical sensor.

Further, according to the invention, the fused tracks are constructed in real time from GTPs (super-plots), which include SRP detections from the GMTI radar tracks and EO detections from EO sensors.

The technique of the present invention enables constructing all possible fused tracks, and then choosing the best one (i.e., the track that has the highest score).

Contrary to the prior art track-to-track fusion technique, the technique of the present invention has no need to apply an assignment procedure between GMTI tracks and optical tracks.

The technique of the present invention enables corrections of registration of optical maps. An optical map is a picture. The location of a target on the picture is indicated by x-y pixel numbers. In practice, one has to locate the picture (EO map) on the world map and then to calculate the fused tracks based on the EO targets. The technique of the present invention enables accurate association of an EO target with an appropriate GMTI target. Since the range of the GMTI target is rather accurate and the location of the GMTI radar is also known, one can use this information to recalculate the location of the appropriate EO target, and then to improve the location of the optical map.

In the system of the present invention, the number of GMTI radars is not restricted to one, and likewise for the number of optical sensors.

Since the technique of the present invention utilizes SRPs rather than GMTI plots, the effect of the relatively large errors of the GMTI plots is negligible. The fused tracks are constructed from super-plots, which combine the data of both GMTI plots and EO detections.

The technique of the present invention enables to correct constant errors in measurements of radial distance and azimuth angle provided by GMTI radar in real time.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
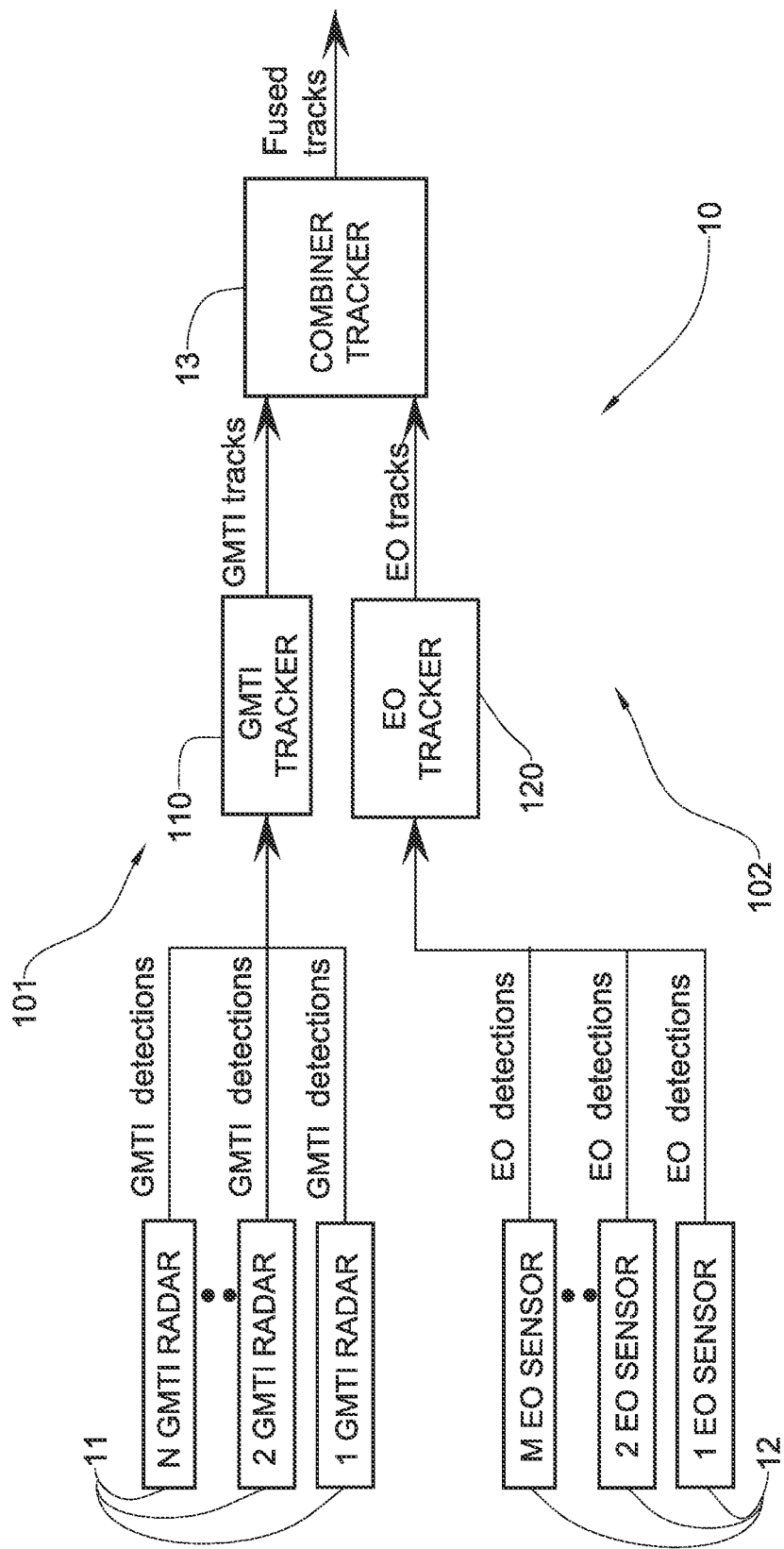
FIG. 1 illustrates a general flow chart block diagram of a prior art fusion system for constructing ground tracks of ground targets from detections obtained from GMTI radars and EO-sensors.

The principles and operation of the fusion system according to the present invention may be better understood with reference to the drawings and the accompanying description, it being understood that these drawings and examples in the description are given for illustrative purposes only and are not meant to be limiting. The same reference numerals and alphabetic characters will be utilized for identifying those components which are common in the fusion system and its components shown in the drawings throughout the present description of the invention.

Figure 2:
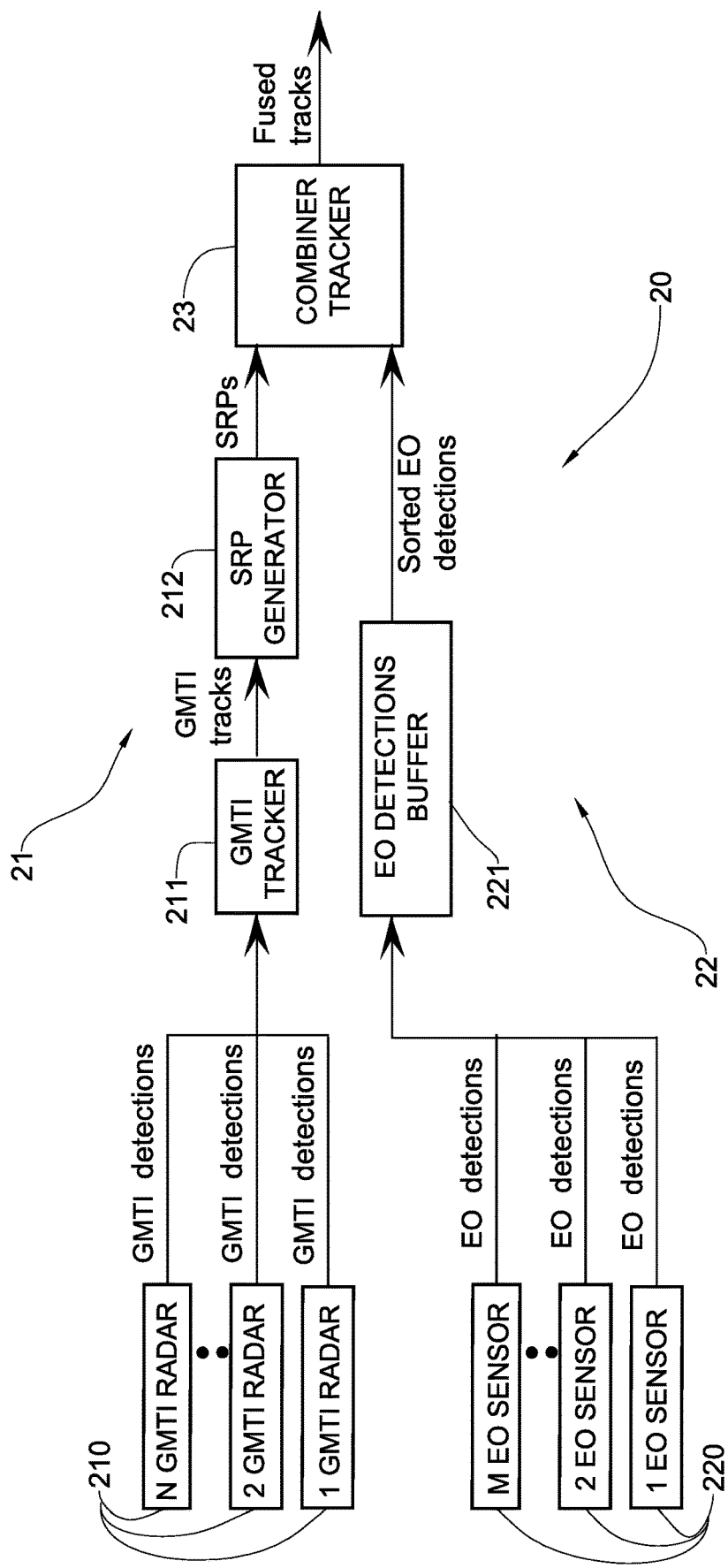
FIG. 2 illustrates a general block diagram of a fusion system for constructing ground tracks of ground targets from detections obtained from GMTI radars and EO-sensors, according to an embodiment of the present invention.

Referring to FIG. 2, a general block diagram of a fusion system 20 for constructing tracks of ground targets from radar and optical detections is illustrated, according to an embodiment of the present invention. The fusion system 20 has a radar channel 21 and an electro optical (EO) channel 22.

The radar channel 21 includes one or more GMTI radars 210 providing GMTI detections. The radar channel 21 of the system 20 also includes a GMTI tracker 211 arranged downstream of the GMTI radars 11 and is configured for constructing GMTI tracks of ground targets from the GMTI plots provided by the GMTI radars 210. In the present invention, the GMTI tracker 211 is not bound to a specific tracker, and can be a conventional GMTI tracker.

The radar channel 21 of the system 20 also includes a Smooth Radar Plot (SRP) generator 212 arranged downstream of the GMTI tracker 211. The SRP generator 212 is configured for processing GMTI tracks and producing Smooth Radar Plots (SRPs). According to an embodiment of the present invention, an SRP of a given track at a certain time corresponds to a location of the target on the GMTI track at this time. Such SRPs for a given track are obtained by sequentially in time assigning a corresponding GMTI plot to the given track, applying an appropriate filter to the GMTI plot to obtain an updated track each time, and then by calculating the location of the target on the updated track at the corresponding times.

Accordingly, the SRPs generator 212 includes an assigning system (not shown) configured for sequentially assigning the GMTI plots to corresponding GMTI tracks, a suitable filter (not shown) configured for applying to the GMTI plots, and an SRP calculator (not shown) configured for sequentially calculating location of the ground target on the GMTI tracks. Examples of filters suitable for the present invention include, but are not limited to, Covariance Intersection filters, Maximum Likelihood, Covariance Intersection filters and/or Kalman Filters, etc.

Each SRP has a 4 dimensional state vector (x, y, $v_x$, $v_y$) and a corresponding covariance matrix, which is a 4×4 matrix $$\begin{pmatrix} \sigma_x^2 & \sigma_x\sigma_y & \sigma_x\sigma_{v_x} & \sigma_x\sigma_{v_y} \\ \sigma_x\sigma_y & \sigma_y^2 & \sigma_y\sigma_{v_x} & \sigma_y\sigma_{v_y} \\ \sigma_x\sigma_{v_x} & \sigma_y\sigma_{v_x} & \sigma_{v_x}^2 & \sigma_{v_x}\sigma_{v_y} \\ \sigma_x\sigma_{v_y} & \sigma_y\sigma_{v_y} & \sigma_{v_x}\sigma_{v_y} & \sigma_{v_y}^2 \end{pmatrix},$$

where $\sigma_x$, $\sigma_y$, $\sigma_{v_x}$ and $\sigma_{v_y}$ are the variances of the corresponding variables x, y, $v_x$, $v_y$.

The EO channel 22 includes one or more EO-sensors 220 providing pictures in pixels, from which EO detections in the form of coordinates of the target can be obtained. It should be noted that a number of the EO-sensors 220 in the EO channel 22 may differ from the number of the GMTI radars 210 in the radar channel 21.

Thus, each EO detection includes information on the location of the target. It should be understood that if a location (e.g., longitude and latitude) of the picture's scene is known on the world map, then, by applying geo-referencing, location of the target presented in the picture can also be known.

The information provided by the EO sensors 220 also includes noise and other uncertainties related to the target location. In this case, the state vector that defines the target in time for a certain location is a two dimensional vector (x, y), which is also associated with a 2×2 covariance matrix for the noise $$\begin{pmatrix} \sigma_x^2 & \sigma_x\sigma_y \\ \sigma_x\sigma_y & \sigma_y^2 \end{pmatrix},$$

where $\sigma_x$ and $\sigma_y$ are the corresponding variances of x and y. As noted above, contrary to radar plots, no information on the velocity of the target is known from the EO detections of optical sensors.

When the number of EO-sensors 220 is more than one, the optical channel 22 of the system 20 also includes an EO detections buffer 221 arranged downstream of the EO-sensors 220. The EO detections provided by the EO sensors 220 are fed into the EO detections buffer 221. The EO detections buffer 221 is configured for collecting EO detections from all the EO-sensors 220 online, sorting these detections in time, and providing sorted detections.

The radar channel 101 and the optical channel 102 are combined by a combiner tracker 23 arranged downstream of the SRPs generator 212 and the EO detection buffer 221. The combiner tracker 23 is configured for producing fused tracks by combining the data generated by the SRP generator 212 that provides Smooth Radar Plots with the data relayed from the EO detection buffer 221 that injects the sorted detections one by one into the combiner tracker 23.

It should be noted that in the prior art track-to-track system (10 in FIG. 1), fusion tracks are formed by combining two types of tracks, such as radar tracks generated by GMTI tracker (110 in FIG. 1) with optical tracks generated by EO tracker (120 in FIG. 1). Contrary to the prior art system 10, the system 20 of the present invention creates fusion tracks by the combiner tracker 23 in FIG. 2 by combining two types of plots, such as smooth radar plots (SRPs) and optical plots (i.e., EO detections). Therefore, the combiner tracker 23 in FIG. 2 is distinguishable from the combiner tracker 13 of FIG. 1. It should be understood that although both trackers (the combiner tracker 13 of FIG. 1 and the combiner tracker 23 in FIG. 2) yield fused tracks, the fused tracks produced by the system 20 of the present invention shown in FIG. 2 differ from the fused tracks of the prior art system 10 shown in FIG. 1.

It should be noted that the prior art track-to-track system 10 shown in FIG. 1 has a few major drawbacks when compared to the system 20 of the present invention. One drawback is associated with the fact that the combiner tracker of the prior art system handles radar and optical tracks, thus lacking direct information on the optical plots in the combiner tracker. A further drawback is associated with a delay between the time of the EO detection and the time of providing the data (EO tracks) to the combiner tracker (13 in FIG. 1).

Figure 3:
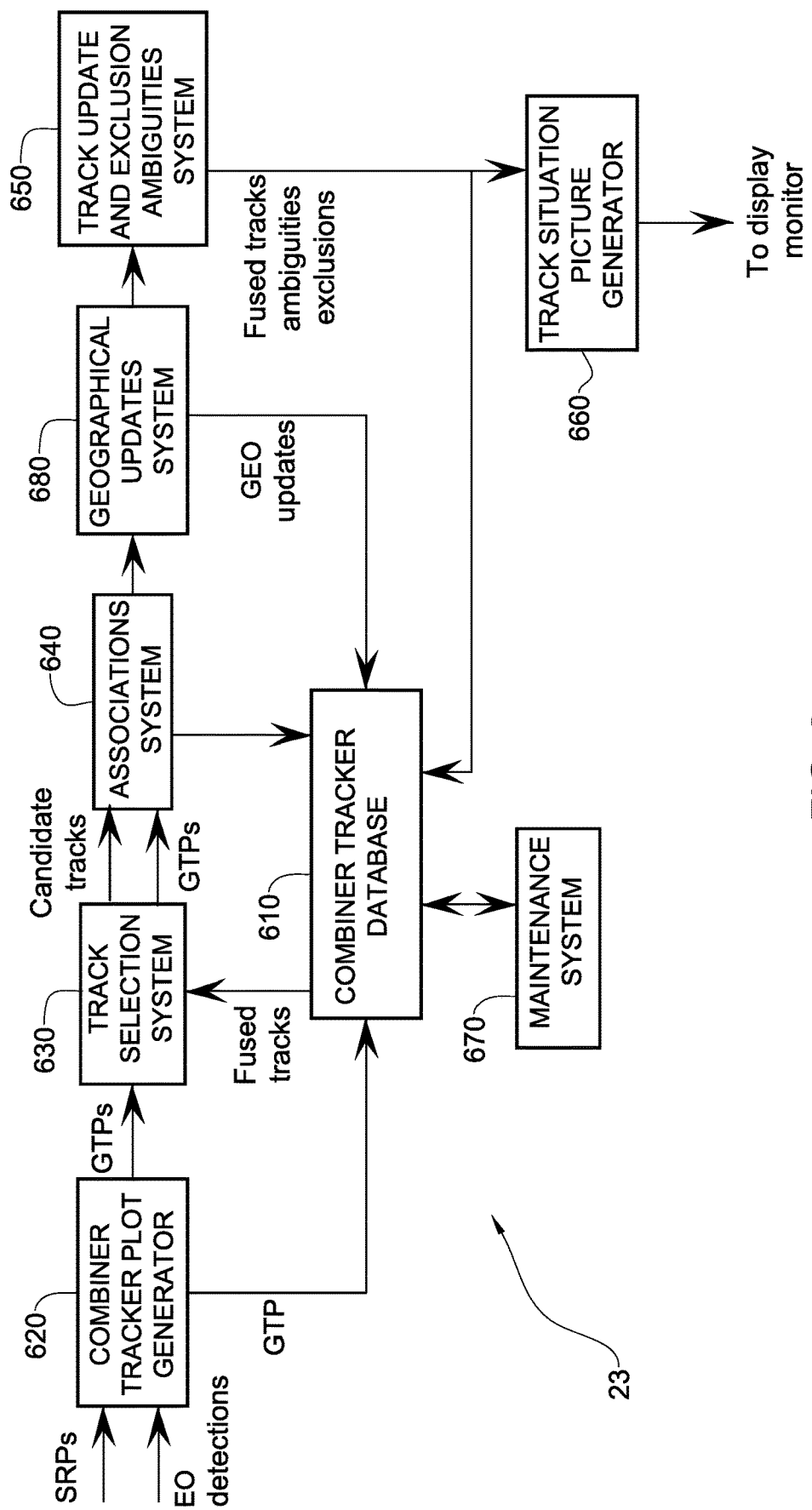
FIG. 3 illustrates a block diagram of the combiner tracker of the system of FIG. 2, according to an embodiment of the present invention.

Referring to FIG. 3, a block diagram of the combiner tracker 23 of the system of FIG. 2 is illustrated, according to an embodiment of the present invention. The combiner tracker 23 receives sequentially in time SRPs described above and EO detections in the form of coordinates of the target, and generates fused tracks.

According to an embodiment of the present invention, the combiner tracker 23 includes a combiner tracker plot generator 620 configured to receive SRPs and EO detections, and to generate ground target plots (GTPs), which are also referred to as "super-plots" in the present description. According to an embodiment, each GTP includes a combination of an SRP of the radar channel (21 in FIG. 2) and an EO detection of the EO channel (22 in FIG. 2), which are combined into a one-state vector.

According to an embodiment of the present invention, the combiner tracker 23 also includes a candidate track selection system 630 coupled to the combiner tracker plot generator 620, an associations system 640 coupled to the combiner tracker plot generator 620, a geographical updates system 680 coupled to the associations system 640, a track update and exclusion ambiguities system 650 coupled to the geographical updates system 680, a track situation picture generator 660 coupled to the track update, and an exclusion ambiguities system 650.

As shown in FIG. 3, the combiner tracker 23 also includes a combiner tracker database 610 coupled to the systems 620-680. The combiner tracker 23 also includes a maintenance system 670 coupled to the combiner tracker database 610.

Figure 4:
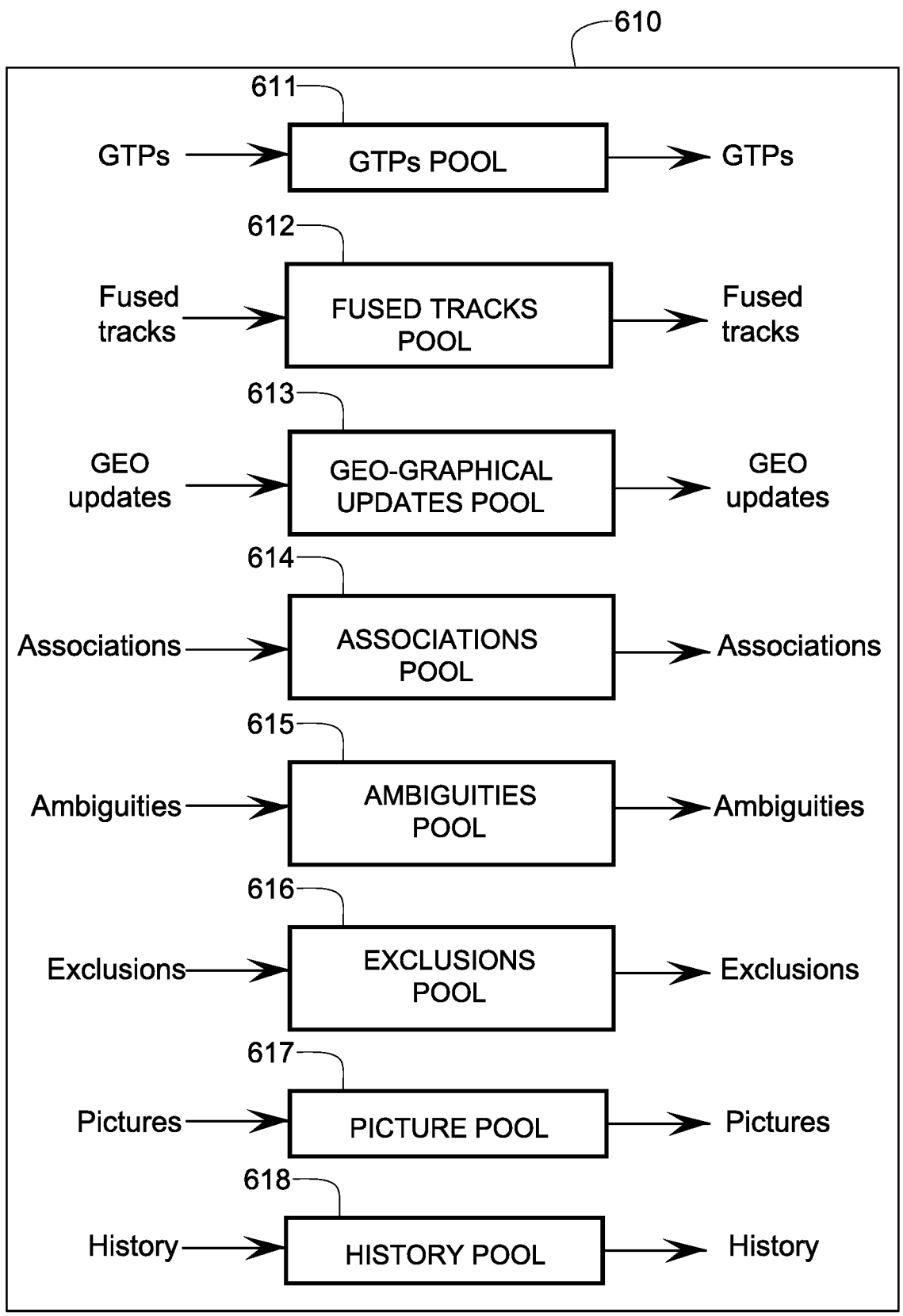
FIG. 4 illustrates a block diagram of the data base of the combiner tracker of FIG. 3, according to an embodiment of the present invention.

Referring to FIG. 4, a block diagram of the combiner tracker database 610 of the combiner tracker 23 of FIG. 3 is illustrated, according to an embodiment of the present invention.

According to this embodiment, the combiner tracker database 610 includes the following database pools:

A GTPs pool 611 configured to store all super-plots, i.e. GTPs constructed from SRPs and EO detections. The input of the GTPs pool 611 is coupled to the combiner tracker plot generator 620, while the output of the GTPs pool 611 is coupled to the candidate track selection system 630. In operation, GTPs generated by the combiner tracker plot generator 620 are stored in the combiner tracker database 610.

A fused tracks pool 612 configured to store all the updated fused tracks that were calculated. The input of the fused tracks pool 612 is coupled to the track update and exclusion ambiguities system 650, while the output of the Fused Tracks Pool 612 is coupled to the candidate track selection system 630.

A geographical updates pool 613 configured to store all the data related to location of the updated fused tracks on the real world map. The input of the geographical updates pool 613 is coupled to the geographical updates system 680, while the output of the geographical updates pool 613 is coupled to the candidate track selection system 630.

An association pool 614 configured to store all associations between the fused tracks and the super-plots with the corresponding scores. The input of the association pool 614 is coupled to the track update and exclusion ambiguities system 650, while the output of the association pool 614 is coupled to the candidate track selection system 630.

An ambiguities pool 615 configured to store information on all ambiguities along with a list of the corresponding tracks where the ambiguities appear. It should be noted that in the method of the present invention all the appropriate fused tracks with each new super-plot are constructed consequently. However, at the end, the best fused tracks (best picture) are displayed. It should be noted that each super-plot appears only one time in the best picture. In other words, each super-plot can appear only in one fused track. Therefore, for each super-plot, all the ambiguities should be stored along with the list of the corresponding tracks. The input of the ambiguities pool 615 is coupled to the track update and exclusion ambiguities system 650, while the output of the ambiguities pool 615 is coupled to the candidate track selection system 630.

An exclusion pool 616 is related to the ambiguities pool 615 and is configured to store information on all exclusions, including a list of excluded tracks. In the method of the invention, when desired, a list of excluded tracks (i.e. the fused tracks, which are not used in the best picture, since in the best picture each super-plot can appear only in one track) can also be constructed and taken into consideration. The input of the exclusion pool 616 is coupled to the track update and exclusion ambiguities system 650, while the output of the exclusion pool 616 is coupled to the candidate track selection system 630.

A picture pool 617 configured for storing all best pictures. Each best picture includes the best fused tracks, i.e., the fused tracks having the greatest scores. In such pictures, each super-plot appears only in one track. Preferably, at least one more picture, in addition to the best picture, is also calculated and stored in the picture pool 617, since these pictures can also be useful in the future processing. The input of the picture pool 617 is coupled to the track update and exclusion ambiguities system 650, while the output of the picture pool 617 is coupled to the candidate track selection system 630.

A history pool 618 is configured to store the information history on previous pictures. Thus, in order to save space, old information can, periodically, be deleted. The input of the history pool 618 is coupled to the track update and exclusion ambiguities system 650, while the output of the history pool 618 is coupled to the maintenance system 670.

Turning back to FIG. 3, each GTP (super-plot) generated by the combiner tracker database 610 is fed sequentially in time to the candidate track selection system 630 configured for finding a plurality of candidate fused tracks that can be associated with the corresponding super-plot. The candidate tracks are selected from the fused tracks fed from the fused tracks pool 612 of the combiner tracker database 610. The candidate tracks can, for example, be fused tracks that have a longer length. Likewise, fused tracks that have a higher score based on a higher value of the likelihood function can be selected as candidates for further processing.

The candidate tracks found by the candidate track selection system 630 and the corresponding GTP are sequentially fed into the associations system 640 configured for computing a value of likelihood functions (i.e. associations) for the corresponding GTP to be associated with the selected candidate tracks. The higher the likelihood of the association, the higher the score of the corresponding fused track.

Figure 5:
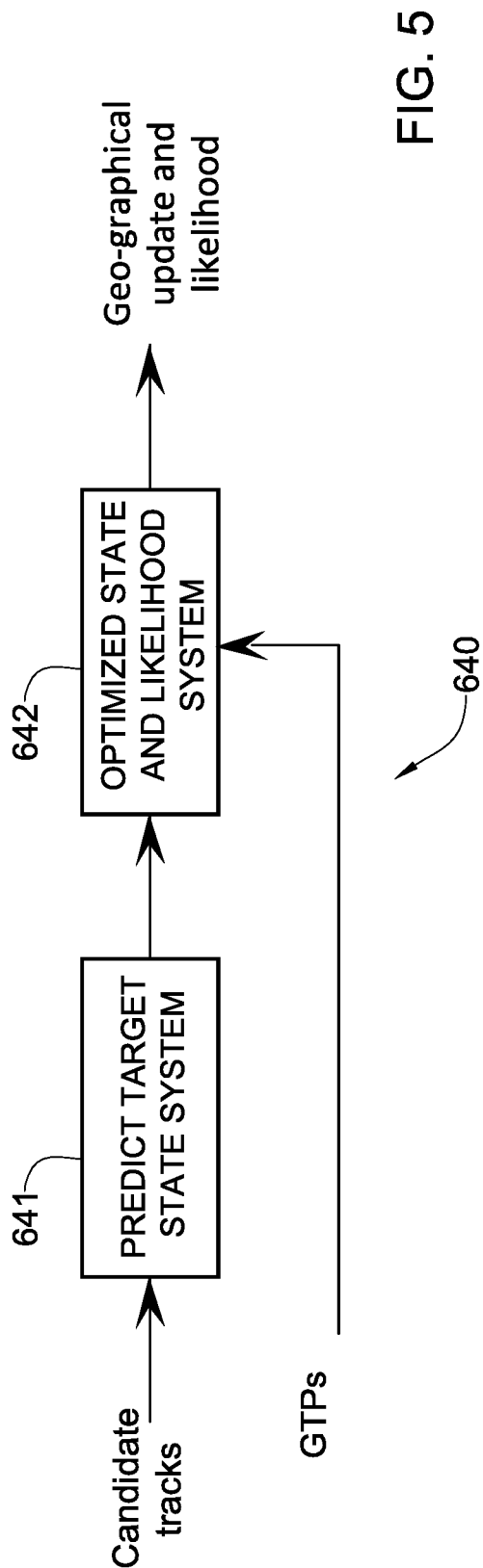
FIG. 5 is a block diagram of the system for assignment procedure carried out by the combiner tracker of the system of FIG. 2, according to an embodiment of the present invention.

A block diagram, and the corresponding operations of the associations system 640, is shown in FIG. 5. As shown in FIG. 5, the associations system 640 includes a prediction target state system 641 which sequentially in time predicts the last target state (target coordinates and velocity) for each candidate track from the plurality of candidate tracks associated with a new GTP at the corresponding times. The associations system 640 also includes an optimized state and likelihood system 642 in which an assignment procedure is applied for the predicted fused tracks and the corresponding GTP for computing updated optimized target states and the likelihoods of association of the GTP with the predicted fused tracks. This calculation can, for example, be carried out by applying an appropriate filter, such as a Kalman filter a Covariance Intersection filter end/or a Maximum Likelihood filter, etc. Thus, a score is assigned to each fused track. The higher the likelihood of the association, the higher the score of the fused track.

When required, the updated fused tracks calculated by the associations system 640 are fed sequentially in time to the geographical updates system 680 configured for calculating geo-updates. The geo-updates are stored in the Geographical Updates pool 613 of the combiner tracker database 610. The geographical updates of the GTP (geo-updates) can also be calculated and stored in the geographical updates pool 613 of the combiner tracker database 610.

As shown in FIG. 3, all the fused tracks associated with corresponding GTPs are further updated in the track update and exclusion ambiguities system 650. The associations of the GTPs with the corresponding fused tracks, ambiguities of such associations, and exclusions of certain tracks from further consideration, are calculated and stored sequentially in time in the association pool 614, ambiguities pool 615 and in the exclusion pool 616 of the combiner tracker database 610, correspondingly.

The track situation picture generator 660 is configured for selecting the best fusion tracks generated by the track update and exclusion ambiguities system 650 and generating a ground fusion track picture, in which the best fused tracks are selected. According to an embodiment, the best fused tracks are the tracks which have the highest score. In the best fused tracks, each GTP appears only one time in the picture (i.e., in one track). Such generation of the ground fusion track picture can be carried out periodically, for example, once every few seconds. For example, a period for generating a ground fusion track picture can be in the range of 5 seconds to 10 seconds. The fusion tracks that belong to the best picture are submitted to a display monitor (not shown) for presentation. The best fusion tracks (which are also referred to as best picture) are also stored in the picture pool 617 and in the history pool 618 of the combiner tracker database 610.

Figure 6:
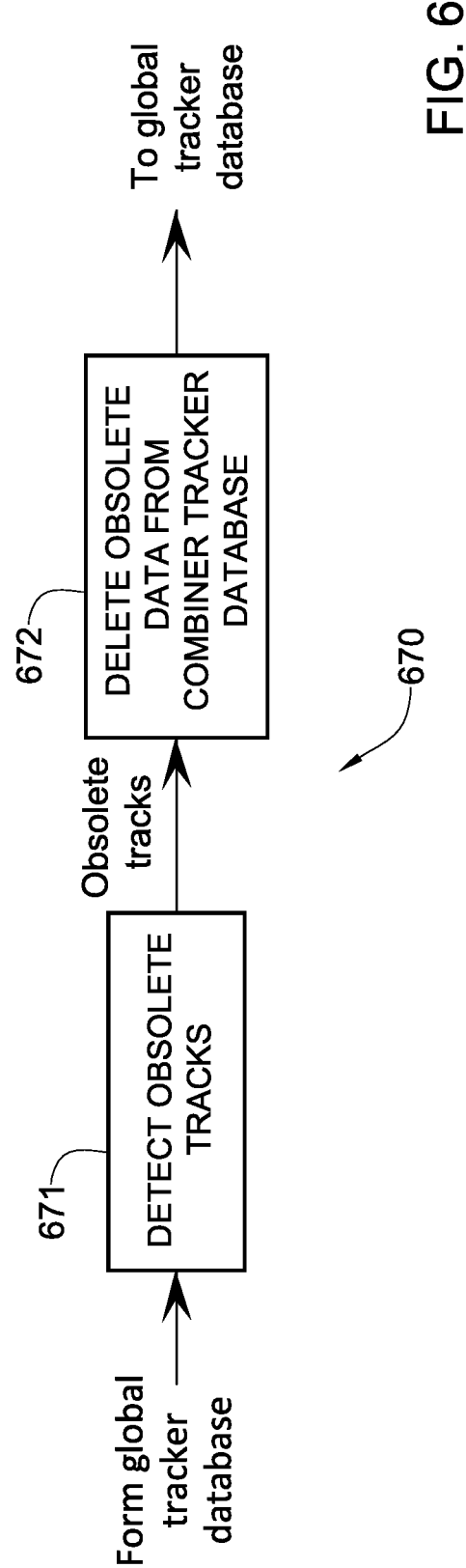
FIG. 6 is a block diagram of an algorithm for deleting obsolete tracks from the data base of the system of FIG. 2, according to an embodiment of the present invention.

According to an embodiment of the present invention, maintenance can be carried out periodically by the maintenance system 670, for example, once every few seconds. In this operation, the maintenance system 670 checks for obsolete tracks in the history pool 618. FIG. 6 illustrates a flow chart of the maintenance procedure carried out by maintenance system 670. For example, obsolete tracks are the tracks which have not been updated for a long time. Such obsolete tracks can be detected (block 671) and then deleted (block 672) when the elapsed time from the last update is more than a given constant.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A fusion system for constructing tracks of a ground target from radar and optical detections, the fusion system comprising:
   a radar channel including:
      at least one Ground Moving Target Indicator (GMTI) radar providing GMTI detections in the form of GMTI plots;
      a GMTI tracker arranged downstream of said at least one GMTI radar, and configured for constructing GMTI tracks of the ground target from the GMTI plots provided by said at least one GMTI radar; and
      a Smooth Radar Plots (SRPs) generator arranged downstream of the GMTI tracker and configured for sequentially in time producing smooth radar plots in the form of locations of ground target on the GMTI tracks and corresponding location errors;
   an optical channel including:
      at least one electro optical (EO) sensor sequentially in time providing EO detections in the form of coordinates of the ground target; and
   a combiner tracker configured for sequentially in time combining data streams of the radar channel generated by the SRPs generator with data streams of the optical channel provided by said at least one EO sensor, and producing fused tracks of the ground target.

2. The fusion system of claim 1, wherein the optical channel includes:
   a plurality of electro optical (EO) sensors providing EO detections in the form of coordinates of the ground target; and
   an EO detections buffer arranged downstream of said plurality of the EO-sensors, and configured for providing sorted in time EO detections to the combiner tracker.

3. The fusion system of claim 1, wherein the SRPs generator includes:
   an assigning system configured for sequentially assigning the GMTI plots to corresponding GMTI tracks;
   a filter configured for applying to the GMTI plots; and
   a SRP calculator configured for sequentially calculating location of the ground target on the GMTI tracks.

4. The fusion system of claim 3, wherein the filter includes at least one of Covariance Intersection filters, Maximum Likelihood filters, or Kalman filters.

5. The fusion system of claim 1, wherein the combiner tracker includes:
   a combiner tracker plot generator configured for sequentially receiving SRPs and EO detections, and combining them in one-state vectors, thereby generating ground target plots (GTPs);
   a candidate track selection system coupled to the combiner tracker plot generator, said candidate track selection system configured for sequentially finding a plurality of candidate fused tracks that can be associated with a corresponding GTP obtained from said combiner tracker plot generator;
   an associations system coupled to said combiner tracker plot generator; said associations system configured for sequentially computing a value of likelihood functions for association of the corresponding GTP with said plurality of candidate fused tracks to provide a score and update each fused track;
   a geographical updates system coupled to said associations system, said geographical updates system configured for sequentially receiving updated fused tracks calculated by the associations system and calculating geo-updates;
   a track update and exclusion ambiguities system coupled to said geographical updates system, said track update and exclusion ambiguities system configured for receiving the associations of the GTPs with the corresponding fused tracks generated by the associations system, and calculating ambiguities of such associations and exclusions of certain tracks;
   a track situation picture generator coupled to said track update and exclusion ambiguities system; said track situation picture generator configured for periodically selecting best fusion tracks generated by said track update and exclusion ambiguities system, and generating ground fusion track pictures including best fused tracks which have the highest score; and
   a combiner tracker database coupled to said combiner tracker plot generator, said candidate track selection system, said associations system, said geographical updates system, and to said track update and exclusion ambiguities system.

6. The fusion system of claim 5, wherein the associations system includes:
   a prediction target state system configured for sequentially in time predicting the target coordinates and velocity for each candidate track from the plurality of the candidate tracks associated with the new GTP at the corresponding times; and an optimized state and likelihood system configured for applying an assignment procedure for predicted fused tracks and the corresponding GTP for computing optimized target coordinates and velocity and a likelihood of the association of the GTP with the predicted tracks.

7. The fusion system of claim 6, wherein said optimized state and likelihood system includes a filter, wherein the filter includes at least one of Kalman filters, Covariance Intersection filters, or Maximum Likelihood filters.

8. The fusion system of claim 5, wherein the combiner tracker database includes the following database pools:

a GTPs pool configured to store the GTPs generated by the combiner tracker plot generator; where an input of the GTPs pool is coupled to the combiner tracker plot generator, while an output of the output of the GTPs pool is coupled to the candidate track selection system;

a fused tracks pool configured to store the updated fused track that were calculated; where an input of the fused tracks pool is coupled to the track update and exclusion ambiguities system, while an output of the fused tracks pool is coupled to the candidate track selection system;

a geographical updates pool configured to store data related to location of the updated tracks on a real world map, where an input of the geographical updates pool is coupled to the geographical updates system, while an output of the geographical updates pool is coupled to the candidate track selection system;

an association pool configured to store associations between the fused tracks and the GTPs, where an input of the association pool is coupled to the track update and exclusion ambiguities system, while an output of the association pool is coupled to the candidate track selection system;

an ambiguities pool configured to store information on ambiguities along with a list of the corresponding tracks in which the ambiguities appear, where an input of the ambiguities pool is coupled to the track update and exclusion ambiguities system, while an output of the ambiguities pool is coupled to the candidate track selection system;

an exclusion pool configured for storing a list of excluded tracks, where an input of the exclusion pool is coupled to the track update and exclusion ambiguities system, while the output of the exclusion pool is coupled to the candidate track selection system;

a picture pool configured for storing pictures including fused tracks having the greatest score; where an input of the picture pool is coupled to the track update and exclusion ambiguities system, while an output is coupled to the candidate track selection system; and a history pool configured to store information history on previous pictures; where an input history pool is coupled to the track update and exclusion ambiguities system, while the output is coupled to the maintenance system.

9. The fusion system of claim 8, wherein the combiner tracker further includes a maintenance system coupled to the history pool of said combiner tracker database, said maintenance system being configured for deleting obsolete tracks in the history pool.

10. A method for constructing tracks of a ground target from radar and optical detections, the method comprising:

sequentially in time providing Ground Moving Target Indicator (GMTI) detections from at least one GMTI radar in the form of GMTI plots, and electro optical (EO) detections in the form of coordinates of the ground target by at least one electro optical (EO) sensor;

sequentially in time constructing GMTI tracks of the ground target from the GMTI plots by a GMTI tracker arranged downstream of said at least one GMTI radar;

sequentially in time producing smooth Radar Plots (SRPs) in the form of locations of ground targets on the GMTI tracks and corresponding location errors by a Smooth Radar Plots (SRPs) generator arranged downstream of the GMTI tracker; and combining data streams generated by the SRPs generator with data streams provided by the EO sensor, and producing fused tracks of the ground target.

11. The method of claim 10, further comprising:

sequentially in time providing EO detections in the form of coordinates of the ground target by a plurality of electro EO sensors; and sorting the EO detections and providing sorted in time EO detections to the combiner tracker.

12. The method of claim 10, wherein producing SRPs includes:

sequentially assigning the GMTI plots to corresponding GMTI tracks;

applying a filter to the GMTI plots; and sequentially calculating location of the ground target on the GMTI tracks.

13. The method of claim 10, wherein producing fused tracks of the ground target includes:

sequentially receiving SRPs and EO detections and combining them into one-state vector, thereby generating ground target plots (GTPs);

sequentially finding a plurality of candidate fused tracks that can be associated with a corresponding GTP;

sequentially computing a value of likelihood functions for association of the corresponding GTP with said plurality of candidate fused tracks, providing a corresponding score to each fused track, and generating updated fused tracks;

sequentially calculating geo-updates including data related to location of the updated fused tracks on a real world map;

sequentially receiving the associations of the GTPs with the corresponding updated fused tracks, and calculating ambiguities of such associations and exclusions of certain tracks; and periodically selecting updated fusion tracks having the greatest score, and generating ground fusion track pictures including best fused tracks which have the highest score.

14. The method of claim 13, wherein a period for generating each new ground fusion track picture is in a range of 5 seconds to 10 seconds.

15. The method of claim 13, further comprising sequentially storing the GTPs; the updated fused track; data related to location of the updated fused tracks on a real world map; associations between the fused tracks and the GTPs; information on ambiguities along with a list of the corresponding tracks in which the ambiguities appear; information on exclusions including a list of excluded tracks; the ground fusion track pictures; and information history on previous pictures.

16. The method of claim 13, further comprising providing maintenance by deleting obsolete tracks in the information history.

* * * * *